US007002932B1

(12) United States Patent
Young et al.

(10) Patent No.: US 7,002,932 B1
(45) Date of Patent: Feb. 21, 2006

(54) METHOD AND SYSTEM FOR PROVIDING NETWORK CONNECTIVITY AND MOBILITY WHILE ROAMING

(75) Inventors: Albert Young, Cupertino, CA (US); BoFu Chen, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 741 days.

(21) Appl. No.: 09/759,848

(22) Filed: Jan. 12, 2001

(51) Int. Cl.
   *H04H 1/00* (2006.01)
(52) U.S. Cl. .................... 370/312; 370/338; 455/432.1
(58) Field of Classification Search ............... 370/338, 370/328, 241, 349, 331, 352, 401, 229–234, 370/332, 344, 348, 337, 315, 319, 395.52, 370/465, 466, 312, 353, 354, 386, 389, 392, 370/400; 455/338, 403, 434, 416, 432.1, 455/445; 709/227, 329; 379/201.03
   See application file for complete search history.

(56) References Cited

U.S. PATENT DOCUMENTS

| | | | | |
|---|---|---|---|---|
| 5,564,070 A | * | 10/1996 | Want et al. | 455/507 |
| 5,812,951 A | * | 9/1998 | Ganesan et al. | 455/445 |
| 5,898,679 A | * | 4/1999 | Brederveld et al. | 370/315 |
| 5,987,062 A | * | 11/1999 | Engwer et al. | 375/225 |
| 6,130,892 A | * | 10/2000 | Short et al. | 370/401 |
| 6,154,461 A | * | 11/2000 | Sturniolo et al. | 370/401 |
| 6,414,950 B1 | * | 7/2002 | Rai et al. | 370/338 |
| 6,487,406 B1 | * | 11/2002 | Chang et al. | 455/422.1 |
| 6,512,754 B1 | * | 1/2003 | Feder et al. | 370/338 |
| 6,535,493 B1 | * | 3/2003 | Lee et al. | 370/329 |
| 6,546,425 B1 | * | 4/2003 | Hanson et al. | 709/227 |
| 6,574,197 B1 | * | 6/2003 | Kanamaru et al. | 370/252 |
| 6,608,832 B1 | * | 8/2003 | Forslow | 370/353 |
| 6,611,532 B1 | * | 8/2003 | Madour et al. | 370/466 |
| 6,701,361 B1 | * | 3/2004 | Meier | 709/224 |
| 2003/0193895 A1 | * | 10/2003 | Engwer et al. | 370/241 |

* cited by examiner

*Primary Examiner*—Phirin Sam

(57) ABSTRACT

A method and system for providing network connectivity and mobility for a roaming client. Specifically, in one embodiment of the present invention, an access point (AP) is enabled with a smart agent and associated protocol. The smart agent is capable of monitoring the AP link status to the backbone network and where applicable the capability to capture the TCP/IP information. Further, the smart agent located at the AP has the capability of sending the AP connection and network status information to a client when that client associates with the AP, or when the AP's network status or configuration changes. The effect of the invention is to provide a radically simple user experience in networking connectivity and mobility in both wired and wireless network infrastructures.

29 Claims, 4 Drawing Sheets

| OFFSET | SIZE | FIELD |
|---|---|---|
| 0X00 | 30 | MAC HEADER (e.g. 802.11) |
| 0x1E | 2 | Ether Type (Unique Ether Type) |
| 0x20 | 2 | Length |
| 0x22 | 2 | Function type (=" Smart Agent protocol) |
| 0x24 | 1 | Control |
| 0x25 | 1 | Status |
| 0x26 | 1 | Sequence number (=1) : Response |
| 0x27 | 1 | Reserved for Vendor Specific |
| 0x28 | 2 | Checksum |
| 0x2A | 1 | AP Ethernet link status ← 310 |
| 0x2B | 1 | AP IP address type (DHCP OR FIXED) ← 315 |
| 0x2C | 4 | IP address ← 320 |
| 0x30 | 4 | IP address mask ← 325 |
| 0x34 | 4 | Default IP Gateway ← 330 |

FIG. 3

METHOD AND SYSTEM FOR PROVIDING NETWORK CONNECTIVITY AND MOBILITY WHILE ROAMING

BACKGROUND OF THE INVENTION

1. Field of the Invention

The present invention relates to the field of communications networks. More particularly, the present invention pertains to a method and system for providing network connectivity and mobility for a roaming client.

2. Related Art

In a wireless communication network environment, a "client" node is associated to an "Access Point" (AP) in order to access a backbone or distribution communication network. The AP can be a hub or a switch in a wired network and the AP is commonly known as a Wireless Access-Point in a wireless LAN (Local Area Network). An AP has to be successfully connected to the backbone network before the client is able to log on to the backbone network.

FIG. 1 shows a communication network 50 in the prior art that shows a wireless communication network that is coupled to a backbone network via a wired connection, such as Ethernet. The wireless network consists of at least one access point (AP) connected to the wired network infrastructure and a set of wireless end stations, or clients, that are associated with that particular AP. The AP acts as a bridge between the wired and wireless networks. Additionally, a subnetwork, or subnet, may contain one or more APs along with their respective associate clients.

FIG. 1 shows two access point wireless networks, AP-A network 110 and AP-B-network 150, in a communication network 50. In AP-A network 110, an access point AP-A 112 is wired to the backbone network 130. Various clients, A-1 114, A-2 116, on up to A-n 118 are connected to AP-A through a wireless connection to form AP-A network 110. Similarly, in AP-B network 150, an access point AP-B 152 is wired to the backbone network 130. Various clients, B-1 154, B-2 156, and on up to B-n 158 are connected to AP-B 152 through a wireless connection to form AP-B network 150. The network 50 could support and operate with more than two AP networks.

Additionally, two or more APs, such as AP-A 112 and AP-B 152 may form a subnetwork, where the subnetwork operates with a common network mask and common gateway. Moreover, individual APs may be part of different subnetworks. For example, in FIG. 1, AP-A 112 may be part of sub-network N1 with network mask M1 and Gateway G1, and AP-B 152 may be part of sub-network N2 with network mask M2 and Gateway G2.

An access point acts as the base station for the wireless network, aggregating access for multiple wireless end stations or clients onto the wired network, such as the backbone network 130 in FIG. 1. Each AP communicates with the clients over the wireless medium that is associated with that AP. For example, AP-A 112 communicates with its associate clients A-1 114, A-2 116, and on up to A-n 118. The AP communicates with other APs and other nodes on the network 50 via the backbone network 130. A function of the AP, among many others, is to relay network traffic from its associated clients. The destination of this traffic may be another end station in the same, or different, AP network, or the destination may be a node on a wired LAN (such as ethernet) connected to the backbone network. The AP provides this relaying function for end stations simultaneously.

A problem arises where a client, such as a notebook with networking capabilities, roams from a first subnet to a second subnet. For example, a user operating the client notebook may bring the client notebook to another building location, that is located in a different subnet, for a meeting. The mobility of the client requires the connection/disconnection or association/disassociation to occur between different APs from time to time. The challenge here is to have the various APs and the client communicate intelligently such that the network connection appears to be radically simple to the user throughout the client's mobility. When a client moves from a first subnet to a second subnet, its IP (Internet Protocol) address being used in the previous subnet might not be valid in the second subnet.

Additionally in the wireless LAN world, a client may have to associate with another AP in a second subnet even though the client hasn't physically moved. This may be due to a failure of the association with the original or first AP. The connection status of the AP to the backbone is commonly not reported to the user when the AP-backbone connection fails, leaving the user uninformed of its loss of transmission.

There are several possible scenarios where a client may experience loss of connection from the backbone network 130. For example, looking at FIG. 1, assume that we have a client A-2 116 and several AP's, namely AP-A 112, AP-B 152, on up to AP-n (not shown). Further, assume that AP-A 112 along with AP-A network 110 belong to subnetwork N1 (not shown) with network mask M1 and Gateway G1, and AP-B 152 along with AP-B network 150 belong to subnetwork N2 (not shown) with network mask M2 and Gateway G2 as in FIG. 1.

First, if the client A-2 116 roams or disconnects/reconnects with its associated AP-A-112, there may be a loss of connection from the backbone network 130. Initially, the client is within the service area of AP-A 112. After boot up, the client will send out a DHCP (Dynamic Host configuration Protocol) request and receive one IP address IP1 associated with subnet N1, network mask M1, and Gateway G1. Subsequently, the client may move around, roam to or connect with another AP in another subnet, such as AP-B 152 in subnet N2. If the client is not aware of the switch to AP-B 152 and uses the same IP1 which is not within subnet N2, Gateway G2 will not forward packets sent by the client whose default gateway is G1. In most cases, N1 and N2 are different, that is AP-A 112 and AP-B 152 reside on different subnets.

Second, in the above example, when AP-A 112 loses its backbone connection, a resulting loss of connection occurs between the client A-2 116 to the backbone connection 130. In general, if an AP's link to the backbone is lost, its connected or associated clients will have no knowledge of such network failure and the associated clients will have to wait for the network administrator to pinpoint the problem and fix it. If it's a wireless AP, during this downtime period, any new wireless client that roams to this AP will not be able to connect to the backbone network even though the client successfully associates with the AP. Additionally, the new wireless client would not know that there is not a connection between the AP and the backbone connection 130.

Thus, there is a need for a more efficient system for monitoring connectivity to a communication network, especially when a client roams throughout a communication network from one subnet to another subnet.

SUMMARY OF THE INVENTION

The present invention provides a method and system for providing network connectivity and mobility for a roaming client. Also, the present invention provides a method and system that achieves the above accomplishment and which also provides a better mutual information exchange protocol between clients and access points in a dynamic networking environment.

Specifically, in one embodiment of the present invention, an access point (AP) has the capability of sending the AP connection and network status information, such as its own IP address, subnet mask, and gateway information, to a client when that client associates with the AP, or when the AP's network status or configuration changes.

Furthermore, the connection and network status information of an AP in relation to its backbone network is provided to the clients associated with the AP by means of a smart agent and an associated protocol installed upon the AP. The smart agent is capable of monitoring the AP link status to the backbone network and where applicable the capability to capture the TCP/IP information.

The effect of the invention is to provide a radically simple user experience in networking connectivity and mobility in both wired and wireless network infrastructures. The invention provides an improved mutual information exchange protocol between clients and AP's in a dynamic networking environment.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 3 is a sample packet format in a layer 2 protocol to exchange information between an access point and its associated client in accordance with one embodiment of the present invention.

Figure 1:
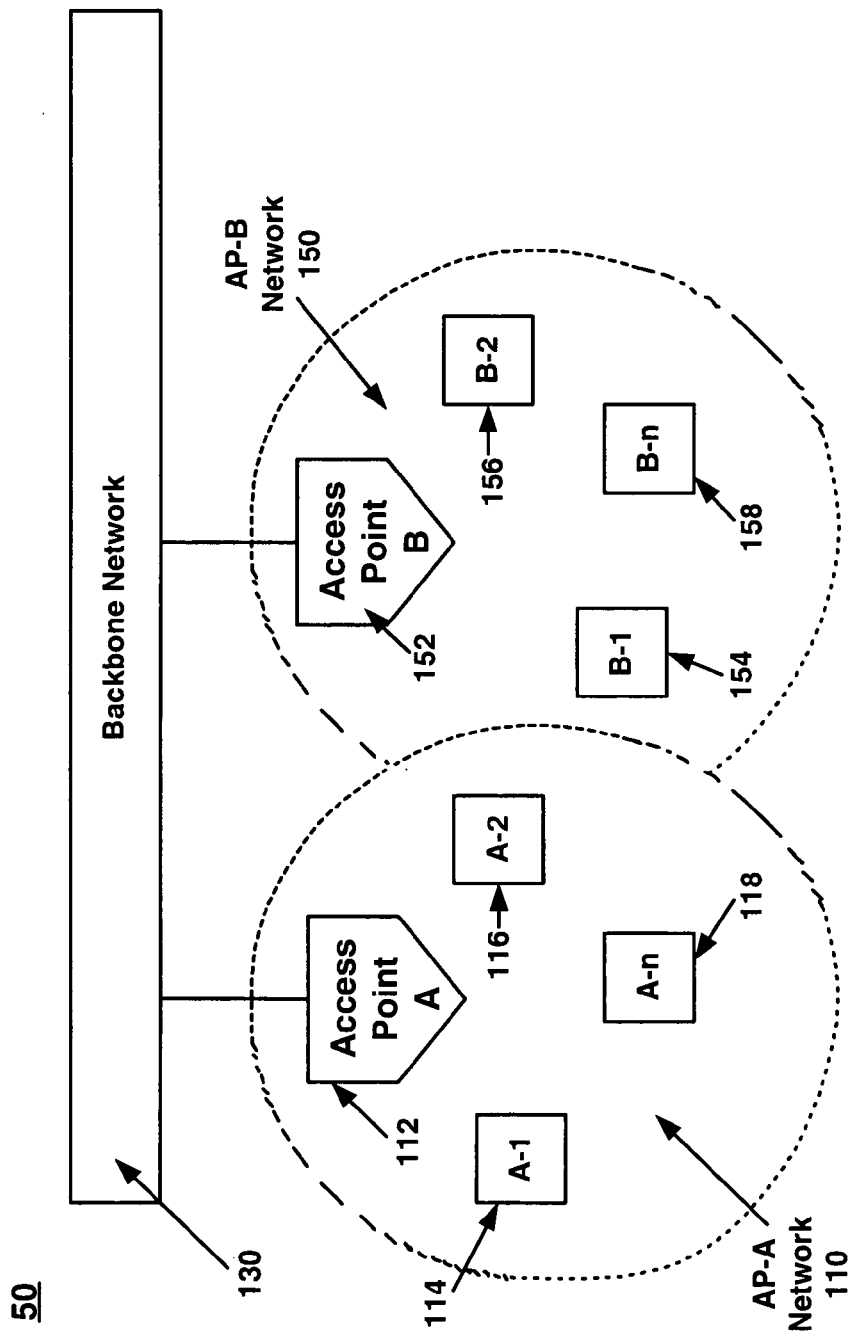
FIG. 1 illustrates a block diagram of a communication network environment in accordance with one embodiment of the present invention.

The drawings referred to in this description should be understood as not being drawn to scale except if specifically noted.

DETAILED DESCRIPTION OF THE INVENTION

Reference will now be made in detail to the preferred embodiments of the present invention, a method and system for providing network connectivity and mobility for a roaming client, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
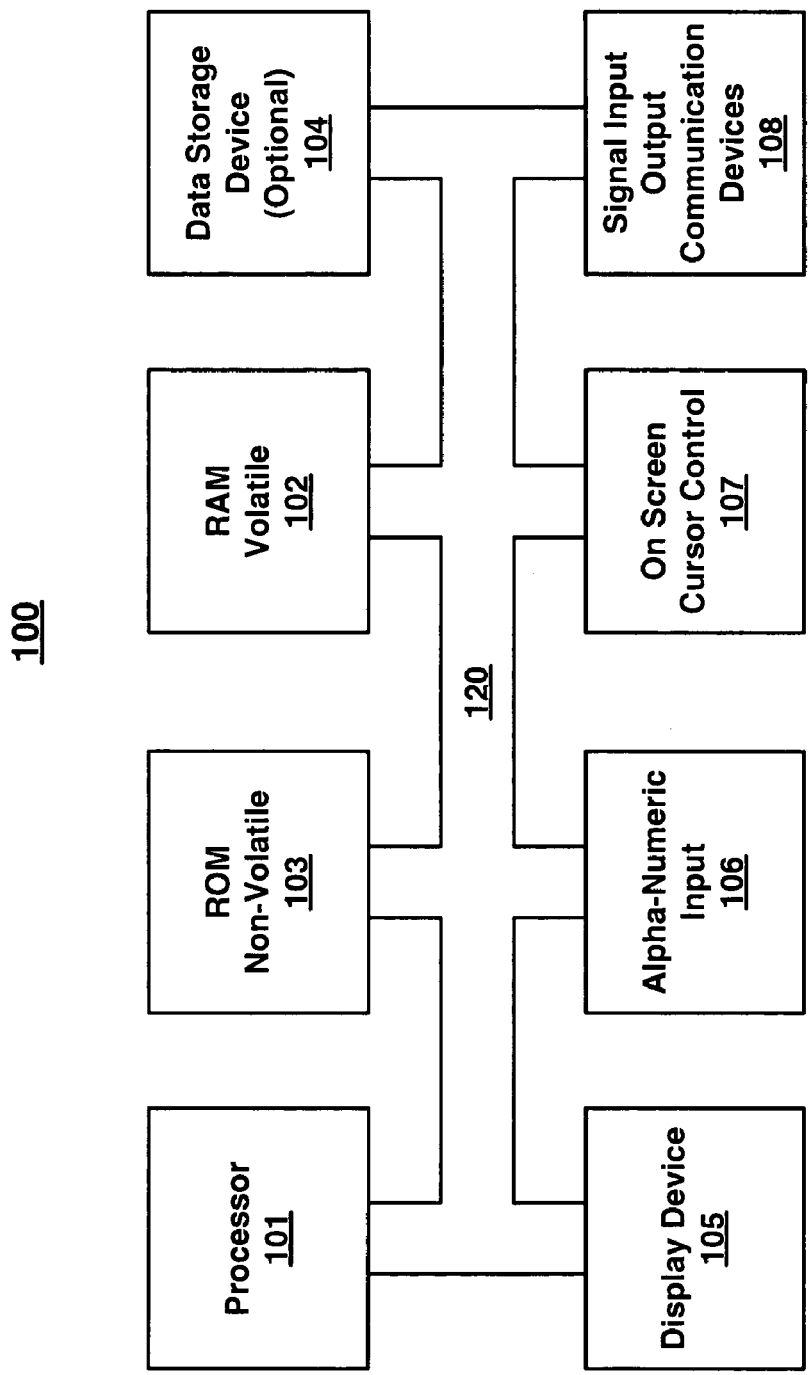
FIG. 2 is a schematic diagram of an exemplary computer system used to perform steps in providing network connectivity and mobility for a roaming client over a communication network, in accordance with one embodiment of the present invention.

Referring to FIG. 2, portions of the methods and systems for providing network connectivity and mobility for a roaming client are comprised of computer-readable and computer executable instructions which reside, for example, in computer-usable media of a computer system, such as that in an access point. FIG. 2 illustrates an exemplary computer system 100 used to perform the dynamic exchange of information between an access point and its associated client in accordance with embodiments of the present invention. It is appreciated that system 100 of FIG. 2 is exemplary only and that the present invention can operate within a number of different computer systems including general purpose networked computer systems, embedded computer systems, and stand-alone computer systems. Additionally, computer system 100 of FIG. 2 is well adapted to having computer readable media such as, for example, a floppy disk, a compact disc, and the like coupled thereto. Such computer readable media is not shown coupled to computer system 100 in FIG. 2 for purposes of clarity.

System 100 can include any computer-controlled software application for determining when to exchange information between an access point and its associated client, and what information to exchange. In general, computer system 100 comprises an address/data bus or other communication means 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, a non-volatile memory 103 (e.g., read only memory (ROM), programmable ROM, flash memory, EPROM, EEPROM, etc.) coupled with the bus 120 for storing static information and instructions for the processor 101, a data storage device 104 (e.g., memory card, hard drive, optical disk, etc.) coupled with the bus 120 for storing information and instructions. System 100 of the present invention also includes an optional display device 105 coupled to the bus 100 for displaying information to the computer user. System 100 also optionally includes an alphanumeric input device 106 including alphanumeric and function keys coupled to the bus 120 for communicating information and command selections to the central processor 101. System 100 also optionally includes a cursor control device 107 coupled to the bus for communicating user input information and command selections to the central processor 101, and an Input/Output (I/O) device 108 coupled to the bus 120 for providing a communication link between computer system 100 and a network environment.

In a wireless environment, the I/O device 108 may be a signal transmitter/receiver device 108, which is coupled to bus 120 for providing a wireless radio (RF) communication link between computer system 100 and other wireless devices.

In one embodiment, computer system 100 of FIG. 2 includes host interface circuitry (not shown) coupled to bus 120. Host interface circuitry includes an optional digital signal processor (DSP) (not shown) for processing data to be transmitted or data that are received via transceiver 108. Alternatively, processor 101 can perform some or all of the functions performed by the DSP.

The display device 105 of FIG. 2 utilized with the computer system 100 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices or by other means such as, for example, voice commands.

It is appreciated that the present invention may be utilized with devices and systems coupled using technologies, standards, and/or communication protocols for both wireless and wired communication standards, including the IEEE 802.11 and Bluetooth wireless communication standards.

Network Connectivity and Mobility for a Roaming Client

The strategic solution here is to add new capabilities into an access point (AP). Each AP has information of its own IP address, subnet mask, and gateway information. A smart agent located at the AP is capable of sending the information to a client at appropriate times.

In one embodiment of the present invention, the connection status of an AP to its backbone network is provided to the clients associated with the AP by means of a smart agent and an associated protocol located and installed upon the AP. The effect of the invention is to provide a radically simple user experience in networking connectivity and mobility in both wired and wireless network infrastructures. The invention provides an improved mutual information exchange protocol between clients and APs in a dynamic networking environment.

For example, in one embodiment of the present invention, each time when a client associates with a new AP, the AP sends the information as described above to the client. The client then can smartly decide if it needs to renew its own IP address, subnet mask, or Gateway settings. When a client associates with (or connects to) an AP, the AP initiates communications back to its associated clients regarding the AP's own network status prior to establishing connections of the client to the backbone network. In another embodiment, the AP only initiates communication with the newly associating client to provide information, such as network status to the client.

In a wireless network the AP acts as a bridge between the client and the backbone network, and the AP sends to any newly associated wireless client the AP information packet containing its network status.

In another embodiment, the smart agent also broadcasts to every associated client when events occur such as when its backbone link is lost or its IP address has changed. The hub/switch at the AP provides capability to monitor the link status of the AP to the backbone network, and if applicable also captures TCP/IP information. For example, the smart agent may generate message frames according to any occurring event in the hub/switch, such as a disconnection of an AP from the backbone network, or a change in the IP address of an AP. In a hub that does not require IP address, information can still be provided for the client's network status diagnostics.

Within the scope of the invention, the client receiving the information will recognize that there is change in status of its associated AP. It might indicate to the client that the AP has lost or regained its backbone link or the AP has a new IP address, or the occurrence of other events. The client can then update its configuration accordingly, or roam to another available AP.

Within an embodiment of the invention, an example of the protocol specification that accompanies the Smart Agent is shown in FIG. 3. The protocol is comprised of a layer 2 protocol whose purpose is to exchange information between a client and an AP. The protocol resides in layer 2 so as to notify clients before the layer 3 network of the client is enabled. The protocol defines a new Ether-Type in the packet frame so it does not have to be in the payload of any existing layer 3 protocol (i.e. IP, IPX, . . . ). This approach minimizes the dependency of the client to a specific protocol stack. The network information of an AP such as "backbone link status", "IP address", "network traffic statistics", and AP loading can be included in this protocol.

A sample packet format as shown in FIG. 3 illustrates the example protocol. Information such as network status, or status of the connection to the backbone network, is shown in line 310. Information such as IP address type is shown in line 315, and the IP address in line 320. Line 325 of FIG. 3 shows the IP address mask. Line 330 shows the IP gateway of the access point.

Figure 4:
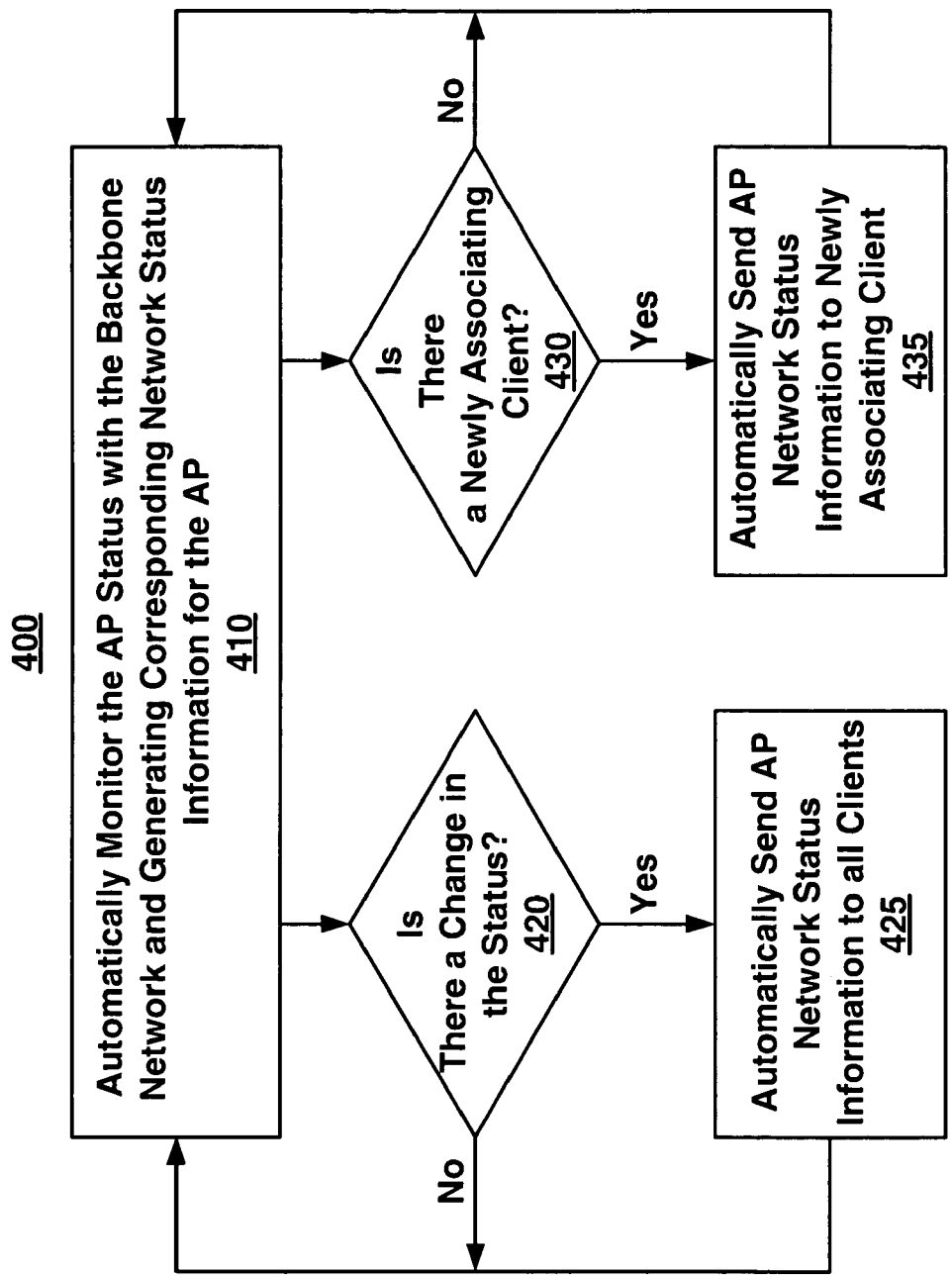
FIG. 4 is a flow chart of steps performed for dynamically providing network connectivity and mobility for a roaming client over a communication network.

FIG. 4 depicts a flow chart 400 for providing network connectivity and mobility for a roaming client, in accordance with one embodiment of the invention. The network status information can be used by the clients to update its configuration accordingly, or for the client to take the necessary action, such as reconnecting to the backbone network when an AP's connection to the backbone network is down.

Flow chart 400 begins with step 410 where an AP is enabled with smart agent capabilities and associated protocol. In step 410, within these smart agent capabilities are comprised the capability to automatically and continually monitor the AP link status to the backbone, and where applicable the capability to capture the TCP/IP information. For example, within the protocol are comprised the backbone link status, the IP address, network traffic statistics, the AP loading information, as well as other pertinent information.

Next, in step 420, the AP has the capability to recognize a change in its network status in relation to the backbone network. For example, as discussed previously, the connection to the network may be down, or the IP address of the AP may have changed.

If there is a change in AP's network status, then in step 425, the AP informs all associated clients of any and all AP configuration and/or status changes upon occurrence of those changes. For example, the changes indicated may be that the AP has lost or regained its backbone connection and/or that the AP has a new IP address including any changes of subnet, or the information included within the protocol in FIG. 3. The smart agent may generate message frames according to any event in the hub/switch, i.e. the AP. The AP then goes back to automatically and continually monitoring its network status in step 410.

Correspondingly, in step 430 of flow chart 400, the AP has the capability to recognize when there is a newly associating client. For example, a client may have roamed into the network of the AP, or the client is booting up within the area of the AP network. If there is a newly associating client, then in step 435, the AP sends its network status information to the newly associating client when the client associates with or connects to the AP. For example, the AP in a wireless network sends its AP information packet, such as that of FIG. 3, to the newly associated client. The AP then goes back to automatically and continually monitoring its network status in step 410.

While the methods of embodiment illustrated in flow chart 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequence of steps can be modified depending upon the application.

The instructions for the steps, and the data input and output from the steps of flow chart 400 may be implemented utilizing processor 101 and ROM memory 103 and RAM memory 102, as shown in FIG. 2. Furthermore, other types of memory storage can be utilized to accomplish the aforementioned such as a hard drive.

Hence, the present invention provides an apparatus and method for monitoring network connectivity to a communication network, especially for a roaming client that goes from one subnet to another subnet. Also, the present invention provides an apparatus and method that achieves the above accomplishment and which also provides a information exchange protocol between clients and access points in a dynamic networking environment.

The preferred embodiment of the present invention, a method and system for providing network connectivity and mobility for a roaming client, is thus described. While the present invention has been described in particular embodiments, it should be appreciated that the present invention should not be construed as limited by such embodiments, but rather construed according to the below claims.

What is claimed is:

1. In a communication network including a subnetwork coupled to a backbone network, said subnetwork including an access point (AP) and a plurality of clients associated with said AP, a method of exchanging network information, comprising the steps of:
    a) at said AP, automatically monitoring network status of said AP on a continual basis over said communication network, said AP coupled to said backbone network;
    b) automatically and dynamically generating network status information for said AP based upon step a); and
    c) from said AP, automatically sending said network status information for said AP without pre-notification to each of said plurality of clients when there is a change in said network status of said AP, said plurality of clients coupled wirelessly to said AP.

2. The method as described in claim 1, wherein said change of network status in step c) includes a failed communications link between said AP and said backbone network.

3. The method as described in claim 1, wherein said change of network status in step c) includes a change of IP address for an electronic device taken essentially from the group consisting essentially of: said AP, a mask associated with said subnetwork, and a gateway associated with said subnetwork.

4. The method as described in claim 1, comprising the further step of:
    d) automatically sending said network status information for said AP to a first client of said plurality of clients when said first client is newly associating with said AP.

5. The method as described in claim 4, wherein a smart agent implements said steps a), b), c) and d), said smart agent located in said AP.

6. The method as described in claim 4, wherein said first client has previously associated with a second AP, said first client having an IP address associated with a second subnetwork, said second subnetwork including a second mask, a second gateway, and said second AP.

7. The method as described in claim 4, wherein said first client, before associating with said AP, does not have any current association with any AP or any subnetwork, nor any IP address.

8. The method as described in claim 4, wherein said access point, said plurality of stations, and said smart agent are substantially compliant with a version of the IEEE 802.11 communications protocol.

9. The method as described in claim 4, wherein said steps c) and d) are implemented through a layer 2 communication protocol.

10. The method as described in claim 1, wherein said network status information is taken from a group consisting essentially of:
    AP Internet Protocol (IP) address;
    AP IP address type;
    subnet mask information;
    subnet IP address;
    subnet gateway information;

subnet gateway IP address; and

AP link status to said backbone network.

11. In a communication network including a subnetwork coupled to a backbone network, said subnetwork including an access point (AP) and a plurality of clients associated with said AP, a method of exchanging network information, comprising the steps of:

a) at said AP, automatically monitoring network status of said AP on a continual basis over said communication network, said AP coupled to said backbone network;

b) automatically and dynamically generating network status information for said AP based upon step a); and c) from said AP, automatically sending said network status information for said AP without pre-notification to each of said plurality of clients when there is a change in said network status of said AP, said plurality of clients coupled wirelessly to said AP; and d) from said AP, automatically sending said network status information for said AP to a first client of said plurality of clients when said first client is newly associating with said AP.

12. The method as described in claim 11, wherein a smart agent implements said steps a), b), c), and d), said smart agent located in said AP.

13. The method as described in claim 12, wherein said access point, said plurality of stations, and a smart agent located in said AP that implements said steps a), b), c) and d) are substantially compliant with a version of the IEEE 802.11 communications protocol.

14. The method as described in claim 11, wherein said change of network status in step c) includes a failed communications link between said AP and said backbone network.

15. The method as described in claim 11, wherein said change of network status includes a change of IP address for an electronic device taken essentially from the group consisting essentially of: said AP, a mask associated with said subnetwork, and a gateway associated with said subnetwork.

16. The method as described in claim 11, wherein said first client has previously associated with a second AP, said first client having an IP address associated with a second subnetwork, said second subnetwork including a second mask, a second gateway, and said second AP.

17. The method as described in claim 11, wherein said first client, before associating with said AP, does not have any current association with any AP or any subnetwork, nor any IP address.

18. The method as described in claim 11, wherein said network status information is taken from a group consisting essentially of:

AP Internet Protocol (IP) address;

AP IP address type;

subnet mask information;

subnet IP address;

subnet gateway information;

subnet gateway IP address; and

AP link status to said backbone network.

19. The method as described in claim 11, wherein said steps c) and d) are implemented through a layer 2 communication protocol.

20. A computer system comprising a processor, a memory unit, and a display screen wherein said memory contains instructions that when executed implement a method of exchanging network information, comprising steps of:

a) at said AP, automatically monitoring network status of said AP on a continual basis over said communication network, said AP coupled to said backbone network;

b) automatically and dynamically generating network status information for said AP based upon step a); and c) from said AP, automatically sending said network status information for said AP without pre-notification to each of said plurality of clients when there is a change in said network status of said AP, said plurality of clients coupled wirelessly to said AP.

21. The computer system as described in claim 20, wherein said change of network status in step c) includes a failed communications link between said AP and said backbone network.

22. The computer system as described in claim 20, wherein change of network status in step c) includes a change of IP address for an electronic device taken essentially from the group consisting essentially of: said AP, a mask associated with said subnetwork, and a gateway associated with said subnetwork.

23. The computer system as described in claim 20, comprising the further step of:

d) automatically sending said network status information for said AP to a first client of said plurality of clients when said first client is newly associating with said AP.

24. The computer system as described in claim 23, wherein a smart agent implements said steps a), b), c) and d), said smart agent located in said AP.

25. The computer system as described in claim 23, wherein said first client has previously associated with a second AP, said first client having an IP address associated with a second subnetwork, said second subnetwork including a second mask, a second gateway, and said second AP.

26. The computer system as described in claim 23, wherein said first client, before associating with said AP, does not have any current association with any AP or any subnetwork, nor any IP address.

27. The computer system as described in claim 23, wherein said access point, said plurality of stations, and said smart agent are substantially compliant with a version of the IEEE 802.11 communications protocol.

28. The computer system as described in claim 23, wherein said steps c) and d) are implemented through a layer 2 communication protocol.

29. The computer system as described in claim 20, wherein said network status information is taken from a group consisting essentially of:

AP Internet Protocol (IP) address;

AP IP address type;

subnet mask information;

subnet IP address;

subnet gateway information;

subnet gateway IP address; and

AP link status to said backbone network.

* * * * *